US011113760B2

(12) United States Patent
Rahaim

(10) Patent No.: US 11,113,760 B2
(45) Date of Patent: Sep. 7, 2021

(54) SPECIALIZED LIABILITY PAYMENT CALCULATOR WITH GRAPHICAL USER INTERFACE

(71) Applicant: HUG Your Student Debt, Inc., Turners Falls, MA (US)

(72) Inventor: Frances Rahaim, Turners Falls, MA (US)

(73) Assignee: HUG YOUR STUDENT DEBT, INC., Turners Falls, MA (US)

(*) Notice: Subject to any disclaimer, the term of this patent is extended or adjusted under 35 U.S.C. 154(b) by 0 days.

(21) Appl. No.: 16/775,875

(22) Filed: Jan. 29, 2020

(65) Prior Publication Data
US 2020/0250744 A1 Aug. 6, 2020

Related U.S. Application Data

(60) Provisional application No. 62/800,921, filed on Feb. 4, 2019.

(51) Int. Cl.
G06Q 40/02 (2012.01)
G06Q 20/22 (2012.01)

(52) U.S. Cl.
CPC .............. G06Q 40/02 (2013.01); G06Q 20/22 (2013.01)

(58) Field of Classification Search
CPC ....... G06Q 40/02; G06Q 20/405; G06N 20/00
USPC .......................................................... 705/39
See application file for complete search history.

(56) References Cited

U.S. PATENT DOCUMENTS

| 5,644,727 | A | * | 7/1997 | Atkins | ..................... | G07F 9/002 |
| | | | | | | 705/40 |
| 5,852,811 | A | * | 12/1998 | Atkins | ................... | G06Q 40/00 |
| | | | | | | 705/36 R |
| 7,925,557 | B1 | * | 4/2011 | Ficery | ..................... | G06Q 40/02 |
| | | | | | | 705/35 |
| 8,370,256 | B1 | | 2/2013 | Murphy | | |

(Continued)

OTHER PUBLICATIONS

Alternative Mortgages: Managed Risk or Gamble? Andrew Olszowy. Communities and Banking. Spring 2006. p. 3-5. (Year: 2006).*

(Continued)

Primary Examiner — Alexander G Kalinowski
Assistant Examiner — John O Preston
(74) Attorney, Agent, or Firm — Cantor Colburn LLP

(57) ABSTRACT

A computer-implemented method for financial liability payment calculation includes receiving, by a processor, a set of financial liabilities of a user. The method further includes detecting, by the processor, a first financial liability that is in negative amortization using a predetermined threshold duration. The method further includes computing, by the processor, a payment schedule for the set of financial liabilities using the predetermined threshold duration. Computing the payment schedule includes computing priorities for each of the financial liabilities, and reordering the financial liabilities according to the priorities. Computing the payment schedule further includes determining suggested payments for each of the financial liabilities using minimum payments specified for each of the financial liabilities. Computing the payment schedule further includes determining a repayment timeline for the set of financial liabilities using the suggested payments. The method further includes displaying, by the processor, the payment schedule via a user interface.

18 Claims, 8 Drawing Sheets

(56) References Cited

U.S. PATENT DOCUMENTS

| | | | |
|---|---|---|---|
| 8,504,470 B1* | 8/2013 | Chirehdast | G06Q 40/02 705/38 |
| 8,660,943 B1* | 2/2014 | Chirehdast | G06Q 40/00 705/38 |
| 2016/0210697 A1* | 7/2016 | Strnad, II | G06Q 40/06 |

OTHER PUBLICATIONS

Alternative Mortgages: Causes and Policy Implications of Troubled Mortgage Resets in the Subprime and Alt-A Markets. Edward V. Murphy. CRS Report for Congress. Oct. 8, 2008 (Year: 2008).*

Mortgage Mechanics II: The Graduated Payment Loan. Peter F. Colwell and Carolyn Dehring. Illinois Real Estate Letter. Winter 1997. p. 12-14. (Year: 1997).*

* cited by examiner

| # | Type | Name of creditor | Current balance | Interest Rate | Interest Type | Minimum Payment | Autopay | Bonus Payment | Frequency |
|---|---|---|---|---|---|---|---|---|---|
| 1 | Mortgage | Bank of USA | $ 193,752.30 | 4.750 % | Fixed | $ 1,910.25 | | $ 0.00 | ☒ |
| 2 | Auto Loan | TD | $ 9,802.00 | 2.900 % | Fixed | $ 322.79 | | $ 0.00 | ☒ |
| 3 | Credit Card | Chase | $ 1,860.15 | 9.990 % | Variable | $ 37.00 | | $ 0.00 | ☒ |
|   | ⊙ This card has an introductory rate. Validity: 05-2018 |  |  |  |  |  |  |  |  |
| 4 | Student Ln | Nelnet | $ 9,329.47 | 6.820 % | Fixed | $ 15.00 | | $ 0.00 | ☒ |
|   | ⊙ This loan is in deferment or forbearance. ⊙ Graduated or income based repayment. ⊙ N/A |  |  |  |  |  |  |  |  |
| 5 | Student Ln | US Dept of Ed | $ 22,450.67 | 3.000 % | Fixed | $ 128.00 | | $ 0.00 | ☒ |
|   | ⊙ This loan is in deferment or forbearance. ⊙ Graduated or income based repayment. ⊙ N/A |  |  |  |  |  |  |  |  |
| 6 | Personal Loan | Discover | $ 13,458.00 | 7.990 % | Fixed | $ 172.00 | | $ 0.00 | ☒ |
| 7 | 401K | 401 K loan | $ 3,200.00 | 4.250 % | Fixed | $ 165.00 | | $ 0.00 | ☒ |
| 8 | Credit Card | BoA | $ 7,800.00 | 10.990 % | Variable | $ 152.00 | | $ 0.00 | ☒ |
|   | ⊙ This card has an introductory rate. |  |  |  |  |  |  |  |  |
| 9 | Select One | | $ 0.00 | | | $ 0.00 | | $ 0.00 | ☒ |
| 10 | Select One | | $ 0.00 | | | $ 0.00 | | $ 0.00 | ☒ |

FIG. 2

SPECIALIZED LIABILITY PAYMENT CALCULATOR WITH GRAPHICAL USER INTERFACE

PRIORITY

The present application claims priority to U.S. Provisional Patent Application No. 62/800,921, which was filed on Feb. 4, 2019, the contents of which are included herein in entirety.

BACKGROUND

The present invention relates generally to computing technology, and particularly to improved financial liability payment calculation using a computer to reduce duration of financial liability payments and simulating future financial liabilities.

Consumers can avail several services/products that facilitate them to borrow money. For example, consumers can borrow money from institutional lenders, such as banks, credit unions, government agencies, financial service providers (e.g., 401K plan vendors), credit card companies, and the like. Alternatively, or in addition, consumers can borrow money from various money lending services such as crowd funding companies (e.g., LENDINGTREE®). Further, consumers can borrow money from friends and/or relatives, and other non-institutional private lenders. A consumer, using one or more of these sources, can have financial liabilities such as student loans, home mortgages, business loans, credit card debt, home equity lines of credit, automotive loan, private loans, and the like.

SUMMARY

According to one or more embodiments of the present invention, a computer-implemented method for financial liability payment calculation includes receiving, by a processor, a set of financial liabilities of a user. The method further includes detecting, by the processor, a first financial liability that is in negative amortization using a predetermined threshold duration. The method further includes computing, by the processor, a payment schedule for the set of financial liabilities using the predetermined threshold duration. Computing the payment schedule includes computing priorities for each of the financial liabilities, and reordering the financial liabilities according to the priorities. Computing the payment schedule further includes determining suggested payments for each of the financial liabilities using minimum payments specified for each of the financial liabilities. Computing the payment schedule further includes determining a repayment timeline for the set of financial liabilities using the suggested payments. The method further includes displaying, by the processor, the payment schedule via a user interface.

According to one or more embodiments of the present invention, a system includes a memory device, and a processor coupled with the memory device. The processor performs a method for financial liability payment calculation that includes receiving a set of financial liabilities of a user. The method further includes detecting a first financial liability that is in negative amortization using a predetermined threshold duration. The method further includes computing a payment schedule for the set of financial liabilities using the predetermined threshold duration. Computing the payment schedule includes computing priorities for each of the financial liabilities, and reordering the financial liabilities according to the priorities. Computing the payment schedule further includes determining suggested payments for each of the financial liabilities using minimum payments specified for each of the financial liabilities. Computing the payment schedule further includes determining a repayment timeline for the set of financial liabilities using the suggested payments. The method further includes displaying the payment schedule via a user interface.

According to one or more embodiments of the present invention, a computer program product includes one or more memory devices with computer executable instructions stored thereon, the computer executable instructions when executed by a processor causes the processor to execute a method that includes receiving a set of financial liabilities of a user. The method further includes detecting a first financial liability that is in negative amortization using a predetermined threshold duration. The method further includes computing a payment schedule for the set of financial liabilities using the predetermined threshold duration. Computing the payment schedule includes computing priorities for each of the financial liabilities, and reordering the financial liabilities according to the priorities. Computing the payment schedule further includes determining suggested payments for each of the financial liabilities using minimum payments specified for each of the financial liabilities. Computing the payment schedule further includes determining a repayment timeline for the set of financial liabilities using the suggested payments. The method further includes displaying the payment schedule via a user interface.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

FIG. 2 depicts a graphical user interface to receive user information according to one or more embodiments of the present invention.

Figure 1:
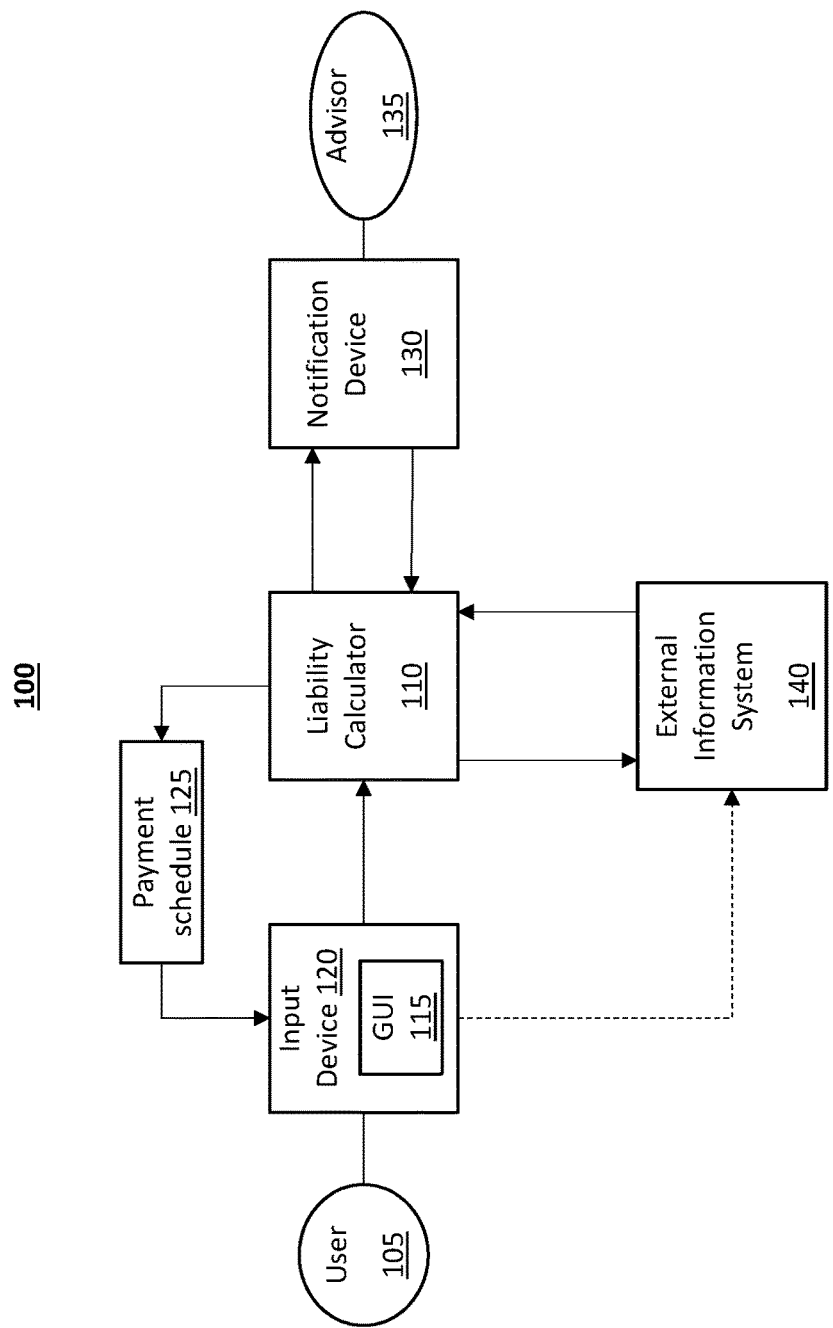
FIG. 1 illustrates a block diagram of an example system for financial liability payment schedule computation in accordance with one or more embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

DETAILED DESCRIPTION

The subject disclosure is directed to computer processing systems, computer-implemented methods, apparatus and/or computer program products that facilitate improved financial liability payment calculation using a computer. A computer, which includes one or more memory devices and one or more processing units, is generally used for financial liability payment calculations. However, technical challenges with using a computer for several different types of financial liability payments is that the processing units are not able to compute payments schedules beyond particular number of payments because the amount of payments can numerically exceed the computational limit(s) of the processing units. For example, a computer may not be able to compute a payoff date for a financial liability in negative amortization because the balance continues to grow exponentially. Further, the technical challenges also include projecting, at real-time, a simulated scenario for a consumer that desires to borrow money at a future time-point.

The technical solutions that are described herein address such technical challenges. By facilitating the computer to handle calculations of the financial liability payments even when the numerical limits are exceeded, the technical solutions described herein improve the operation of the computer. Further, the technical solutions described herein provide practical applications using computing technology to facilitate financial liability payment calculations that may not be possible using a mental process and/or using paper-pencil approach, at least not in a practical time. Additionally, the technical solutions described herein provide a simulation of various debt scenarios at future time-point, in real-time. Further yet, the technical solutions described herein facilitate a user to use a graphical user interface (GUI) via a computing device to enter input data about his/her financial liabilities, financial assets, income, etc., and receive, in real-time, financial liability payments schedule. In addition, in one or more embodiments of the present invention, the technical solutions described herein provide the user with additional information regarding the financial liability payments schedule.

In addition to the technical challenges, one or more embodiments of the present invention address the challenge of helping individuals, families, and business owners, etc. to eliminate all their debt ahead of schedule. Such debt can include student and parent loans, home mortgages, credit cards, home equity loans and lines of credit, business loans, personal loans, and the like. The loans can be from a financial institution like a bank, government agency, friends and relatives, or any other source or a combination thereof. One or more embodiments of the present invention facilitate the user to maintain a present payments schedule that the user may have committed to and yet reduce the duration of the payments that user has to make to be debt free. Accordingly, one or more embodiments of the present invention facilitate the user to maintain his/her present lifestyle and plans for future goals, impending purchases, and a secure retirement. One or more embodiments of the present invention can achieve such results using the technical solutions described herein in conjunction with financial coaching and repayment programs. Accordingly, one or more embodiments of the present invention facilitate retiring debt(s) ahead of schedule, saving users money in interest and other payments.

FIG. 1 depicts a block diagram of a system of a financial liability payment calculation according to one or more embodiments of the present invention. The system 100 that is depicted includes a liability calculator 110, an input device 120, a notification device 130, and an external computing server 140, among other components that are not shown. Each of the depicted components can be a computing device such as a desktop computer, a tablet computer, a laptop computer, a phone, a computer server, or any other such computing device that facilitates network communication. The network communication can be wired or wireless communication.

The liability calculator 110 receives financial information for a user 105 via the input device 120 that is associated with the user 105. In one or more examples, the liability calculator 110 is a computer server that executes one or more computer executable instructions to facilitate the liability calculation and other features that are described herein.

The liability calculator 110 provides a GUI 115 that is displayed on the input device 120. The input device 120 is a computing device that facilitates a user 105 to provide his/her financial information to the liability calculator 110 via the GUI 115. The GUI 115 can include one or more user interactive elements such as text boxes, drop down boxes, buttons, labels, lists, and other elements that facilitate the GUI 115 to provide and/or collect data from the user 105. The types of user elements used in the GUI 115 do not limit the scope of one or more embodiments of the present invention.

FIG. 2 depicts an example graphical user interface according to one or more embodiments of the present invention. The GUI 115 includes one or more rows 210. Each row 210 represents a particular financial liability of the user 105. Each row 210 can represent different types of financial liability. For example, a first row can be for a student loan, while a second row is for a home mortgage, and so on. The user 105 can enter particular information associated with each financial liability in the row 210 that is associated with that financial liability. The user 105 can add and/or delete the row 210. For example, when a new financial liability is undertaken, such as by taking a new loan, the user 105 can create a new row 210 and add the information associated with that new loan. Alternatively, when an existing loan is paid off completely, the user 105 can delete the row 210 that is associated with that loan that is now paid off.

The user 105 can further provide the liability calculator 110 with information about income (e.g., salary, alimony, etc.), retirement funds (401K, individual retirement accounts, etc.), financial assets (inheritance, stocks, savings account, etc.).

It is understood that the depicted GUI 115 in FIG. 2 is an example and that in one or more embodiments of the present invention, the GUI 115 may have a different appearance and request/provide additional or different content about the user's 105 financial liabilities.

Referring back to FIG. 1, the liability calculator 110 uses the data that the user 105 provides via the GUI 115 to perform various calculations and provide a payments schedule 125 for the user 105. The payments schedule 125 includes payments to be made to one or more lenders associated with the financial liabilities provided by the user 105. The payments schedule 125 can be sent to the user 105 in various form, for example, as a paper copy, an email, a hyperlink, or in any other format. Alternatively, or in addition, the payments schedule 125 can be provided to the user 105 via the GUI 115 on the input device 120. The payments schedule 125 is generated in real-time in one or more embodiments of the present invention. The user 105 can edit/add data via one of the rows 210 in the GUI 110 to cause the payments schedule 125 to be updated substantially immediately. The payments schedule 125 can be interactive in one or more embodiments of the present invention.

Figure 3:
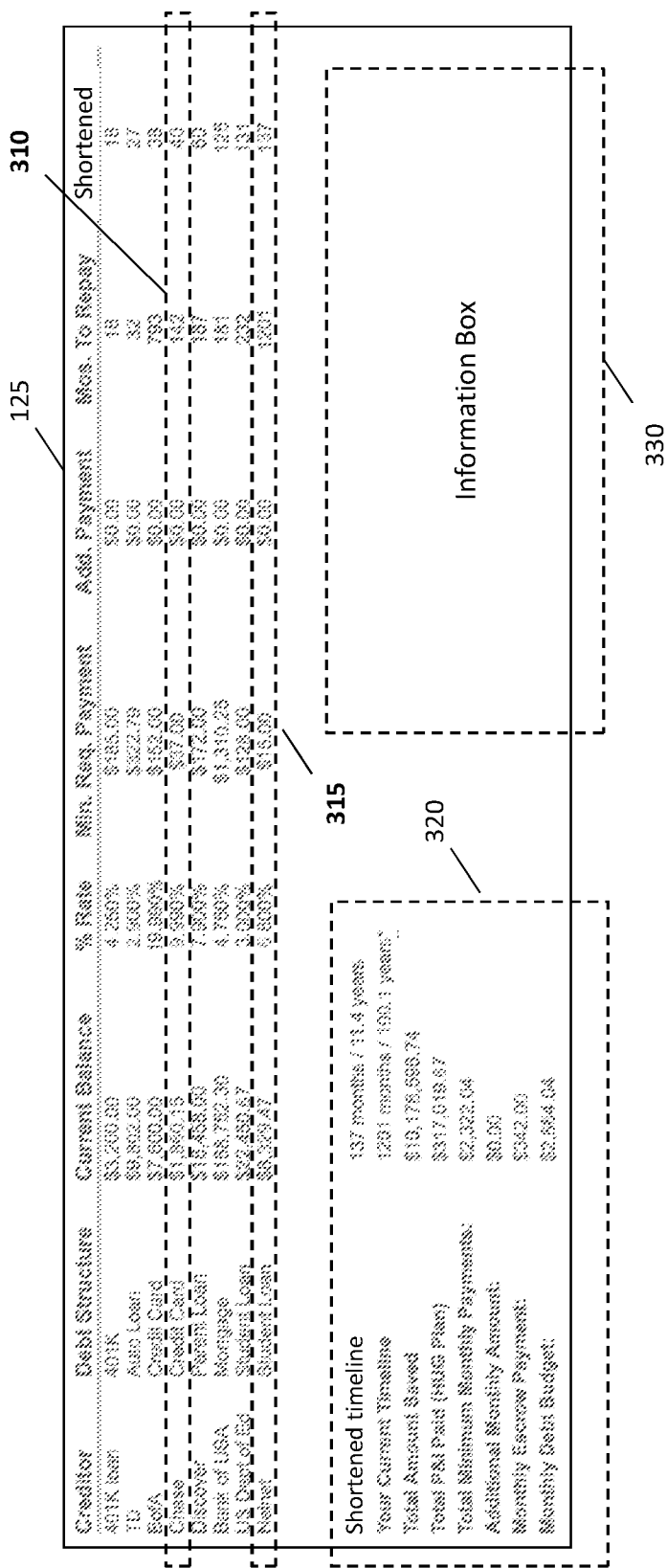
FIG. 3 depicts a graphical user interface to display a payments schedule according to conventional techniques.

FIG. 3 depicts an example payments schedule provided to the user according to one or more embodiments of the present invention. The payments schedule 125 includes debt rows 310, each row 310 corresponding to a particular financial liability of the user 105. It should be noted that the order of the rows 310 (i.e., the financial liabilities) in the payments schedule 125 is different from the order of the rows 210 that the user 105 provides. This is because the debt rows 310 in the payments schedule 125 are ordered according to a priority assigned to each financial liability by the liability calculator 110. Further, the debt row 310 for a particular financial liability includes information that is different from/additional to a corresponding debt row 210 for that particular financial liability. For example, as shown in FIG. 3, the debt row 310 depicts entries for indicating a timeline for paying off the financial liability. The entries can include a present timeline (e.g., Months to repay=142) that is based on the present payments that the user 105 is making towards paying off that financial liability. Further, the entries include a timeline that is shortened (e.g., Shortened=40 months).

In addition, the payments schedule 125, in one or more embodiments of the present invention, includes an information box 320. The information box 320 indicates the shortened timeline, money saved, and other results of calculations performed by the liability calculator 110. In one or more embodiments of the present invention, the information box 320 can further include comparisons between the present payments that the user 105 is making and payments as suggested by the liability calculator 110.

Further, in one or more embodiments of the present invention, the payments schedule 125 includes an education box 330. The education box 330 includes additional information about one or more terms and/or suggestions from the information box 320 and/or the debt rows 310.

The payments schedule 125 can be presented via the GUI 115, and can be interactive. For example, one or more elements in the payments schedule 125 can include a hyperlink, a user interactive element (e.g., buttons) and the like. The user 105 can use the interactivity to make changes to and/or selections from the calculations and suggestions provided in the payments schedule 125. Further yet, in one or more embodiments of the present invention, the user 105 can proceed to schedule and/or complete payments towards the one or more financial liabilities represent by the debt rows 310 via the payments schedule 125.

It is understood that the depicted payments schedule 125 in FIG. 3 is an example and that in one or more embodiments of the present invention, the payments schedule 125 may have a different appearance and request/provide additional or different content about the user's 105 financial liabilities and payment options.

Referring back to FIG. 1, the liability calculator 110 can also provide information regarding the payments schedule 125 and/or other information based on the one or more calculations performed to a notification device 130. The notification device 130 can be a computing device that can receive and provide human-consumed notifications. In one or more embodiments of the present invention, the input device 110 itself can be a notification device 130 so that the user 105 receives the notifications from the liability calculator 110. In addition, or alternatively, the notification device 130 can be a separate communication device that provides the notification(s) to an advisor 135 who is coaching/guiding/advising the user 105. For example, the advisor 135 can be an accountant, a financial professional, financial analyst, or any other person that is privy to the user's financial liabilities and may advise the user 105 in this regard.

In one or more embodiments of the present invention, the liability calculator 110 can access one or more external systems 140. For example, the external system 140 can be a server of a bank or other financial institution. The liability calculator 110 can access the information for the user 105 from the external system 140 to fill in the fields in the debt rows 210. Further, in one or more embodiments of the present invention, the liability calculator 110, via the payments schedule 125, can facilitate the user 105 to complete a payment to/from the external system 140. In one or more examples, the user 105 may have to communicate with the external system 140 via a separate communication channel, such as phone, text messages, email, etc. to confirm one or more transactions that are initiated via the liability calculator 110.

The external system 140 can include payment servers (e.g., PAYPAL®), currency transaction systems (e.g., XOOM®), cryptocurrency exchanges (e.g., COINBASE®), bank servers, or any other such financial transaction systems that provide an application programming interface (API) to facilitate information exchange. In one or more embodiments of the present invention, all the communications performed within and by the system 100 are secured as mandated by local governments. For example, the communication can be encrypted and sent only to verified systems. Further, in one or more embodiments of the present invention, the communications are performed after ensuring authorization of the user 105, for example, using single step authentication, two-step authentication, and other such techniques.

Figure 4:
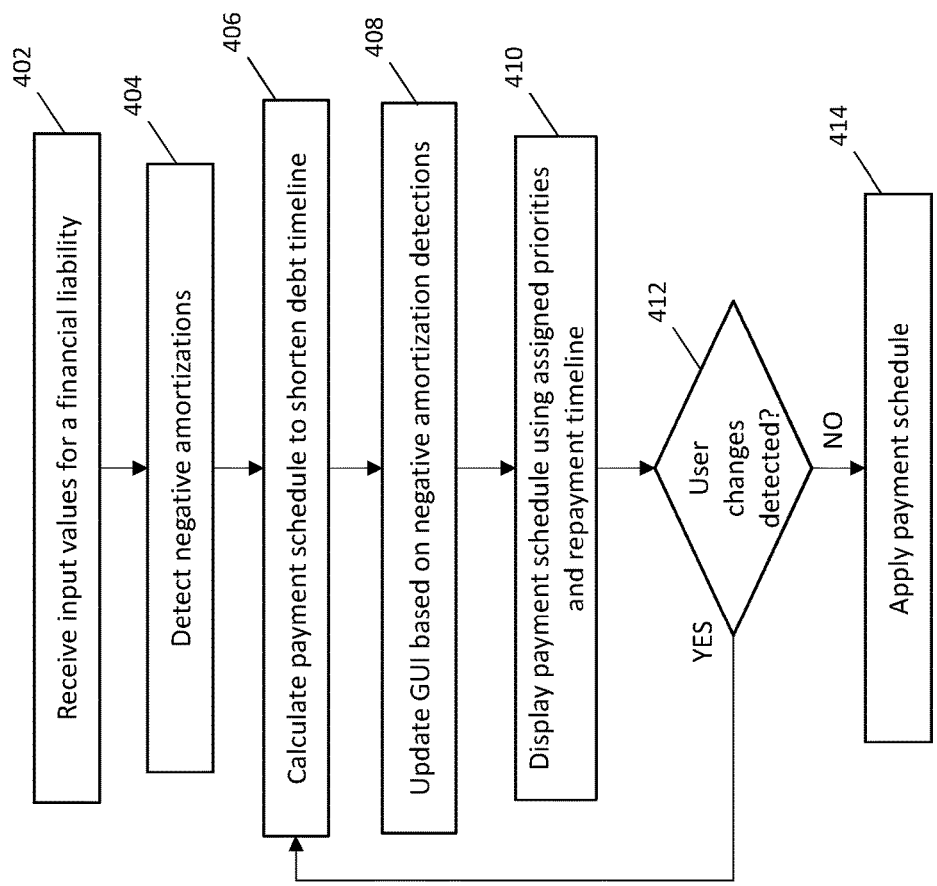
FIG. 4 depicts a flowchart of a method for financial liability payment schedule computation according to one or more embodiments of the present invention.

FIG. 4 depicts a flowchart of an example method of specialized financial liability calculation according to one or more embodiments of the present invention. The method 400 includes receiving, from the user 105, by the liability calculator 110, via the input device 120, information in the debt row 210 for a particular financial liability, at block 402. The information can include a type of the financial liability, for example, student loan, home mortgage, business loan, automotive loan, etc. The information can further include name of the lender, a current balance, an interest rate, an interest type, and a minimum payment that the lender requires from the user 105. The interest type can be fixed rate, variable rate, etc. The minimum payment can be an amount that the lender requests every payment cycle, for example, every month, biweekly etc. Further, in one or more embodiments of the present invention, the information can include any additional payment, exceeding the minimum payment, that the user 105 makes towards that financial liability.

In one or more embodiments of the present invention, receiving the information from the user 105 includes creating additional user interactive elements on the GUI 115 and requesting additional information from the user 105. For example, in response to the user entering/editing a debt row 210, the GUI 115 can provide a user interactive element, for example a radio button, to determine whether the financial liability has multiple interest rates associated with it. For example, a credit card can have an introductory interest rate for a first predetermined duration, and a second interest rate after that first predetermined duration is completed. User 105 is requested for such information to facilitate precise modeling and calculations of the financial liabilities. In one or more embodiments of the present invention, the liability calculator adds user interactive elements such as drop down boxes, text boxes, labels, etc., to request such information in response to the user selecting/indicating that multiple interest rates are associated with the financial liability.

In a similar manner, in case of a particular type of loan type, for example a student loan, the GUI 115 is revised dynamically to seek additional information. For example, in case of a student loan, the liability calculator 110 creates user interactive elements, such as radio buttons, to seek from the user 105 whether the student loan is in forbearance (deferment), or uses an income based repayment (graduated payment or other payment program). It is understood that other and/or additional information can be sought by the liability calculator 110 in one or more embodiments of the present invention. The cases described herein are just few examples where the liability calculator 110 can cause the GUI 115 to update the input fields dynamically as the user 105 is providing the information about the financial liabilities.

Further, the method 400 includes detecting if the financial liability entered by the user 105 is in negative amortization, at block 404. The financial liability is deemed to be in negative amortization if a duration to pay off the financial liability (principal, interest, and any other fees) exceeds at least a predetermined threshold, for example, 50 years, 100 years, or any other such value. However, a technical challenge exists, as noted earlier, when detecting if a financial liability is in negative amortization. This is because, the numerical calculation limits of processing units are exceeded when performing such calculations. To address such technical challenges, in one or more embodiments of the present invention, the threshold value duration is selected such that the calculations stay within such numerical limits.

Figure 5:
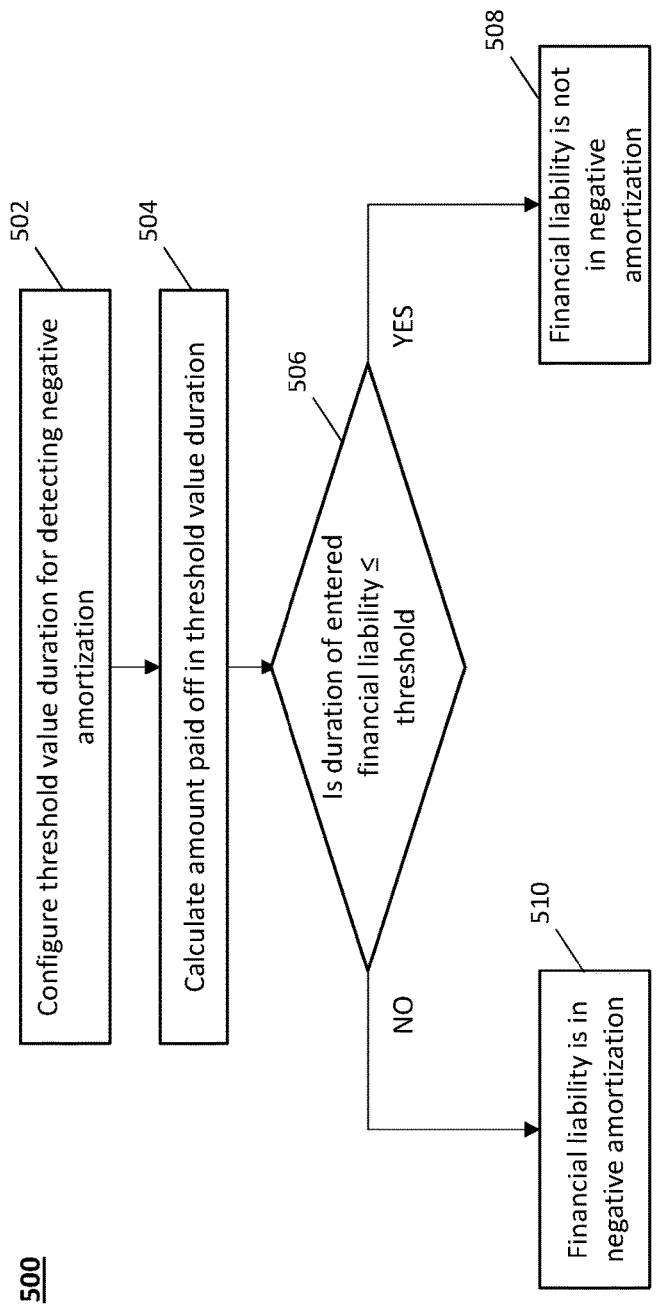
FIG. 5 depicts a flowchart of a method for detecting a negative amortization according to one or more embodiments of the present invention.

FIG. 5 depicts a flowchart for detecting if a financial liability is in negative amortization according to one or more embodiments of the present invention. The method 500 facilitates the liability calculator 110 to detect negative amortization based on the duration, i.e., a number of payments, required to pay off the financial liability. The method 500 includes configuring a threshold value duration for detecting negative amortization, at block 502. The threshold value can be a number of months, number of years or in any other format to indicate a duration.

The threshold value can be based on a processing unit being used by the liability calculator 110 in one or more embodiments of the present invention. The data width of the processing unit is detected and the threshold value is configured accordingly. For example, if the processing unit used by the liability calculator is a 32-bit system, the predetermined threshold can be 50 years, if the processing unit is a 64-bit system, the predetermined threshold can be 100 years. Here an X-bit system indicates a width of a data unit that can be processed by the processing unit. Any other factor of the processing unit can also be used to select the predetermined threshold. For example, the predetermined threshold can be selected based on a speed, a memory capacity, a cache capacity, a network speed, etc., and/or a combination thereof. In one or more embodiments of the present invention, the threshold value is manually configured and updated dynamically. Alternatively, or in addition, the threshold value can be user configurable. Accordingly, a first user can have a negative amortization calculation that uses 50 years as a threshold value, and a second user can have a negative amortization calculation that uses 100 years as the threshold value. Selecting the predetermined threshold in this manner facilitates the computation to be completed by the processing unit without errors (such as processing unit not being able to complete the calculation) and/or erroneous calculations.

The method 500 further includes calculating an amount that can be paid off in the threshold value duration using the present payment amount for that financial liability, at block 504. Any other calculation can also be performed to determine whether the financial liability can be paid off in the threshold value duration. If the financial liability can be paid off in the threshold value duration, that financial liability is deemed not be in negative amortization, at block 508. Alternatively, if the financial liability cannot be paid off in the threshold value duration, the financial liability is deemed to be in negative amortization, at block 510. For example, in FIG. 3, the debt row 315 represents a financial liability that cannot be paid within 100 years (1200 months), and can be identified as a negative amortization where the threshold value duration is configured to be 100 years (or lesser).

Referring back to the flowchart in FIG. 4, once all the financial information is entered by the user 105, the method 400 includes computing, by the liability calculator 110, the payments schedule 125, at block 406. Computing the payments schedule includes computing priorities to the financial liabilities, and reordering the financial liabilities according to those priorities. Computing the payments schedule can also include determining and applying any available margin to accelerate the repayment(s) of the financial liabilities.

Figure 6:
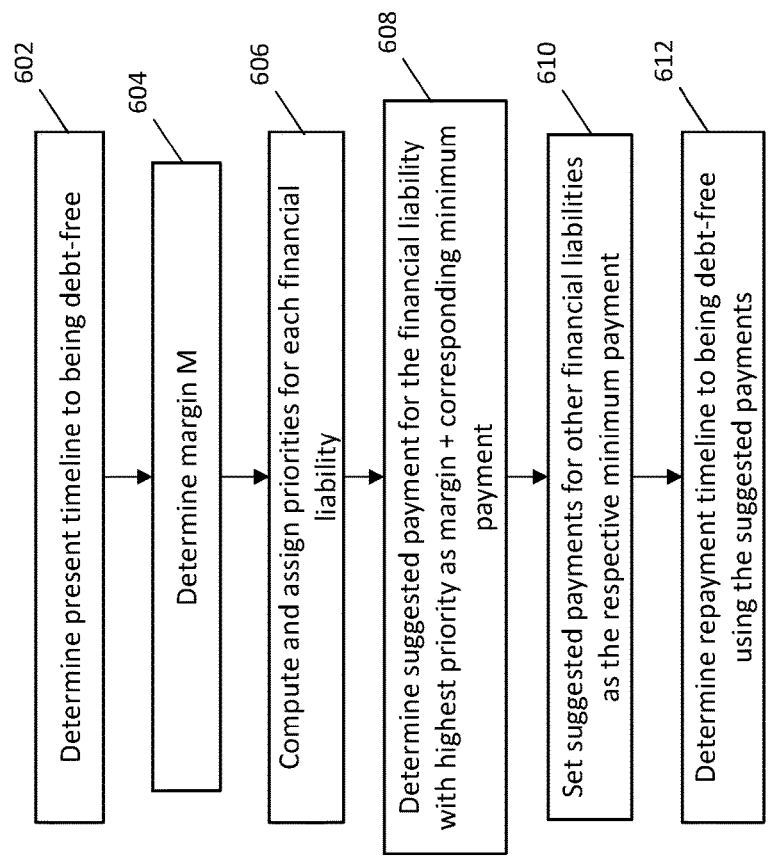
FIG. 6 depicts a flowchart for computing a payments schedule according to one or more embodiments of the present invention.

FIG. 6 depicts a flowchart of an example method for computing the payments schedule according to one or more embodiments of the present invention. The method 600 facilitates the user 105 with the suggested order of priority to retire each financial liability using the same total monthly outlay as s/he originally paid, but sequencing the financial liability payments in such a way that the overall debt-free timeline is accelerated. The method 600 includes computing a present timeline when all financial liabilities, including the negative amortization debt(s), will be paid using the present payments (which are entered in debt rows 210), at block 602. In one or more embodiments of the present invention, the liability calculator caps the repayment period using the threshold duration value that was configured for the negative amortization calculations. The present timeline can be computed by computing an amortization-table/chart for each of the financial liabilities using the information provided by the user 105. The amortization is computed depending on the type of financial liability. For example, the amortization table for a home mortgage, which uses a compounded interest calculation, is computed different from that for an automotive loan, which may use simple interest calculation. Other types of financial liabilities, such as a credit card debt, a student loan, etc. can have different amortization strategies. For example, the liability calculator 110 can use declining payment schedules and other such types of amortization strategies. The liability calculator 110 has predetermined formulas for computing such amortizations for the different types of financial liabilities.

Further, the liability calculator 110 determines if any margin is available, at block 604. The liability calculator 110 determines that margin M is available if one or more financial liabilities have been paid off since (or by) the previous payment made towards those financial liabilities.

For example, referring to FIG. 2, if the financial liability in the debt row 210 of the auto loan is repaid, the minimum payment ($322.79) is set as the margin M. If any other financial liability is also repaid, the minimum payment of that financial liability is added to the present margin M. Alternatively, or in addition, if the user 105 chooses to make additional payments (over the minimum payments specified) towards the repayments, the additional payments are added to the available margin M.

The liability calculator 110 further computes priorities for the financial liabilities, at block 606. In one or more embodiments of the present invention, the priority is computed as: Priority=minimum payment/current balance. The result of the ratio can be weighted or scaled in one or more embodiments of the present invention. The lower the ratio, the lower is the priority. The priorities provide an order of repaying the financial liabilities such that if available margin from every repayment is subsequently used, the total time to repay all the financial liabilities is the shortest. If margin is available and selected by the user to be applied to any particular financial liability, the margin is also taken into account when computing the priority, i.e., the minimum payment is the sum of the specified minimum payment and the margin.

The suggested payment for the financial liability with the highest priority is set as the sum of the minimum payment for that financial liability and the available margin, at block 608. Further, suggested payments for the other financial liabilities are assigned as the respective minimum payments, at block 610. Further, the liability calculator 110 determines the repayment timeline for all of the financial liabilities using the payment schedule that is suggested, at block 612. The liability calculator 110 determines that a financial liability has been paid off by the most recent payment that was made, which is displayed in the payment schedule 125 as described herein. in one or more embodiments of the present invention, if the margin plus the minimum payment is larger than the amount owed on the highest priority debt, the liability calculator 110 splits the margin and allocates the remaining amount from the margin to the next priority financial liability and so on to prevent overpayment and make the most efficient use of the margin. Accordingly, a margin M is set to 0 initially. For each financial liability FL that is paid off, M=M+Minimum Payment of FL. Suggested Payment of the highest priority financial liability HFL=M+ Minimum Payment of HFL. In one or more embodiments of the present invention, M can further include additional payments that the user 105 has selected to apply towards the repayment of the financial liabilities.

In one or more embodiments of the present invention, the payment schedule 125 is computed only up to the threshold duration value (e.g., 50 years, 100 years etc.) that is configured for the negative amortization calculations. This prevents the payment schedule calculations to exceed any numerical limits of the processor/processing units and/or data storage units that are involved in performing the mathematical operations for the calculations.

Further, in one or more embodiments of the present invention, the liability calculator 110 computes a payment that can be applied to each of the financial liabilities that have been determined to have a negative amortization status. The liability calculator 110 computes the payment based on the threshold duration value that was configured, i.e., the liability calculator determines the periodic payment amount that can be applied to such a financial liability so as to have that financial liability paid off in the threshold duration. The computed payment is provided as a suggested payment for that financial liability in the payment schedule 125. As described herein, the user 105 can select to ignore that suggestion or use that suggested payment to accelerate the repayment.

Referring back to the flowchart in FIG. 4, the method 400 further includes updating the GUI 115 to mark the debt row 310 in the payments schedule 125 of the financial liability that is in negative amortization, at block 408. For example, the debt row 310 can be highlighted using a background color, a foreground color, a font, a border, an animation, an icon, or any other such user interface elements. In one or more embodiments of the present invention, a pop up window is shown to bring the negative amortizations to the attention of the user 105. In addition, the GUI 115 can be updated by adding information about the negative amortization in the education box 330.

Further, the payment schedule 125 is displayed via the GUI 115, at block 410. The payment schedule 125 includes the financial liabilities reordered according to the respective priorities that are assigned. In one or more embodiments of the present invention, displaying the payment schedule 125 can include dynamically highlighting one or more portions of the payment schedule 125. For example, if margin is applied to the highest priority financial liability, the minimum payment and the additional payment fields (or any other fields) of that financial liability can be marked to bring them to the attention of the user 105. The highlighting can include any one or more user interface techniques, such as changing background color, foreground color, font, border, icon, animation, pop-up, and the like or a combination thereof.

In one or more embodiments of the present invention, the payment schedule 125 can highlight debt row 210 when the balance of that financial liability reaches $0, that is the financial liability has been repaid. For example, a popup appears providing positive support congratulating the user 105. In one or more embodiments of the present invention, the debt row 210 of a financial liability that has been paid off is persisted using a different (particular) marking to provide such positive support. Further, in one or more embodiments of the present invention, the liability calculator 110 uses the allocated minimum payment of that financial liability to the margin amount, that facilitates accelerating payment of another financial liability. In one or more embodiments of the present invention, the liability calculator 110 confirms with the user 105 that the allocated minimum payment can be used towards the margin. If so, the liability calculator 110 increases the margin amount. Alternatively, the user 105 can select not to use the minimum payment towards the margin.

Displaying the payment schedule 125 also include displaying the repayment timeline that is calculated for the payment schedule 125 using the suggested payments. In one or more embodiments of the present invention, the payment schedule 125 also includes for display a number of months/ years/days saved because of the repayment schedule, i.e., how much the present timeline is shortened by using the payment schedule 125. In one or more embodiments of the present invention, an amount of money saved because of using the payment schedule is also displayed. Other contrasting information between the present repayment plan and the payment schedule 125 can also be displayed in one or more embodiments of the present invention.

The method 400 further includes detecting if the user 105 makes any changes to the payment schedule 125, at block 412. For example, the user 105 can make changes to the suggested payment schedule 125. The changes can include adding additional payments to one or more financial liabilities, reducing suggested payments to one or more financial liabilities, reducing use of the margin for the highest priority financial liability, etc. or a combination thereof. In response to any such changes, the liability calculator 110 re-computes the payment schedule and the corresponding repayment timeline, at block 406. The results are displayed in real-time.

Once the user 105 is satisfied with choices made for the repayment, s/he can select to apply the payment schedule 125 towards repayment(s) of the financial liabilities, at block 414. In one or more embodiments of the present invention, applying the payment schedules can be performed automatically by the liability calculator 110. For example, the liability calculator 110 coordinates with a first external system 130, such as the user's banking account from which a payment is to be made, and a second externa system 130 to which the payment is to be sent. The liability calculator 110 can automatically withdraw the repayment amount for a first financial liability from the banking account and forward the payment to the second externa; system 130. The automatic payments can be scheduled at a particular date of the month, week, etc. the automatic payments can also be scheduled at a particular frequency, for example, monthly, weekly, biweekly, etc. Other options can be provided to the user 105 for scheduling the repayments in one or more embodiments of the present invention. For example, the user 105 can perform one or more of the repayments manually. In one or more embodiments of the present invention, a summary is displayed that groups payments by due dates, or by send dates, to help prevent over-drafting accounts.

In one or more embodiments of the present invention, applying the payment schedule can also include sending one or more reminders to the user 105 and/or the advisor 135. The reminders indicate one or more amounts of payment for corresponding financial liabilities. The reminders can be sent a predetermined configurable amount of time prior to the due date of the payments. For example, if a payment is due on January 15$^{th}$, a reminder can be sent on January 10$^{th}$ (5 days prior), January 8$^{th}$ (one week prior), and the like. The reminders can be sent in the form of emails, short messaging service messages, phone calls, or any other types of reminders.

In the example scenario depicted in FIG. 2 and FIG. 3, it can be seen that the payment schedule suggested shortens the repayment timeline from almost 1201 months (present timeline) to 137 months (shortened timeline). It should be noted that the total of the monthly payments being made in both, the present timeline and the shortened timeline, is the same ($2,322.04). Accordingly, the technical solutions described herein provide the user 105 with a fully dynamic, online, comprehensive financial plan for debt management and facilitates shortening the timeline for repayment of all financial liabilities. In other words, the technical solutions herein provide the user 105 with a suggested order of priority to retire each financial liability using the same total monthly outlay as originally paid but repaying the financial liabilities in such a way that the overall debt-free timeline is accelerated.

The technical solutions described herein can also facilitate using the payment schedule 125 described herein, the user 105 and/or the advisor 135 can simulate "what if" scenarios such as adding or changing margin, moving to lower interest rates for particular financial liabilities etc.

In one or more embodiments of the present invention, the liability calculator 110 executes the method 400 at a predetermined frequency, for example, every day, every week, etc.

Additionally, or alternatively, the technical solutions described herein can facilitate the user to simulate a what-if scenario of adding a financial liability at a future time-point, for example, eight months from now.

Figure 7:
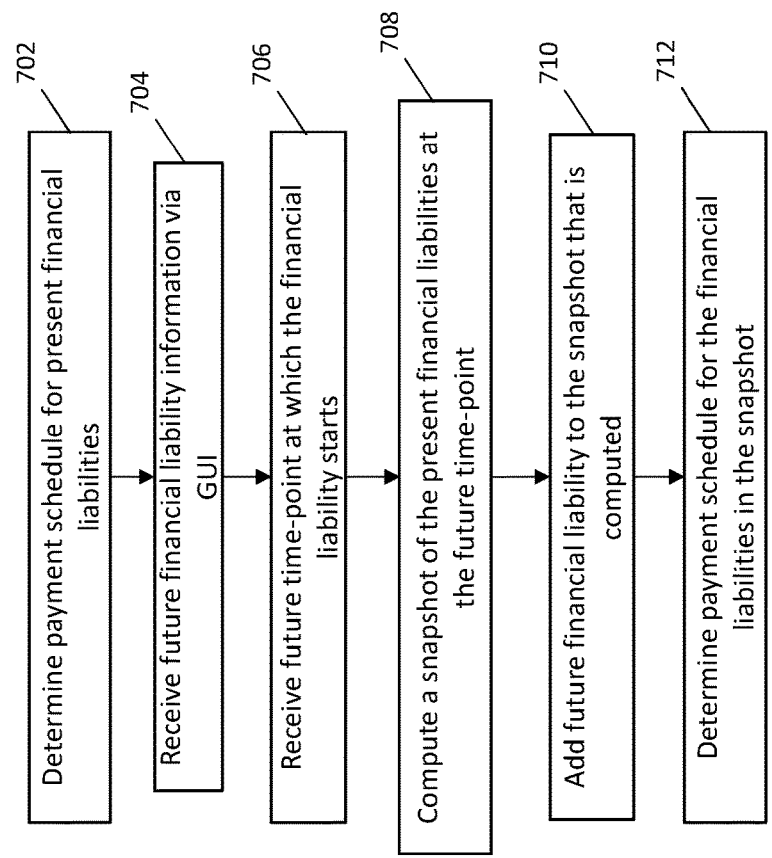
FIG. 7 depicts a flowchart of simulating a future financial liability according to one or more embodiments of the present invention.

FIG. 7 depicts a flowchart of an example method for simulating an additional financial liability at a future time-point according to one or more embodiments of the present invention. The method 700 includes determining payments schedule for present set of financial liabilities, at block 702. This can be performed as described herein so far. Further, the method 700 includes receiving a new debt row 210, at block 704. The new debt row 210 represents the future financial liability that the user 105 wants to simulate. The new debt row 210 includes the information such as the type of the financial liability, the name of the lender, the current balance, the interest rate, and the like.

In addition, the method 700 includes receiving, from the user 105, via the GUI 115, a future time-point at which the user 105 wants to undertake the financial liability, at block 706. The future time-point can be provided as a date in the future, a duration from the present day, and the like.

The method 700 further includes computing, by the liability calculator 110, the status of the present set of financial liabilities at the future time-point, at block 708. Computing the status can include determining current balances of the present financial liabilities at the future time-point. It should be noted that this is not equivalent to simply using amortization charts for each of the financial liabilities. This is because, as described herein, the payment order of the financial liabilities is changed based on the priorities that can change after one or more payments are made. Further yet, if one or more of the present financial liabilities are paid off until the future time-point, the margin that is made available from that repayment can be applied to accelerate the repayment of another financial liability. Accordingly, determining the status of the present set of financial liabilities includes executing, virtually, the method 400 repeatedly up to the future time-point. Each repetition generates a payment schedule 125 that is virtually applied to the present set of financial liabilities. The balances on the present set of financial liabilities is updated for each virtual payment. The computed balances of the financial liabilities are then used as a snapshot of financial liabilities at the future time-point.

Further, the method 700 includes adding the new debt row to the financial liabilities in the snapshot, at block 710. Accordingly, the liability calculator now has a set of financial liabilities at the future time point that includes the new debt row 210. The method 700 further includes computing and displaying the payment schedule 125 using the financial liabilities in the snapshot that is generated, at block 712. The payment schedule 125 generated in this manner will include a timeline when the repayment of the all the liabilities including the future liability will be completed.

In one or more embodiments of the present invention, such forecasting, or simulation can facilitate the user 105 to determine when s/he will have a margin value that can allow a purchase (or any other transaction) without increasing the monthly outlay. For example, in the above method 700, the user 105 provides all the information for the new debt row except the future time-point. The liability calculator 110 then proceeds to compute and apply payment schedules 125 sequentially until the margin value is equal to or exceeds the minimum payment amount of the new debt row 210. The number of periods for which\the payment schedules 125 were applied indicates the future time-point at which the user can complete the desired transaction without additional monthly outlay. Accordingly, the liability calculator 110 can predict the future time-point for the user 105 to enable him/her to plan towards the transaction at that time.

During application of the payment schedules 125, if the liability calculator 110 detects a debt-to-income ratio above a predetermined threshold, a notification can be sent to the notification device 130, in one or more embodiments of the present invention. Along with debt-to-income ratio, the liability calculator 110 can track any other parameters that the user 105 and/or advisor 135 configures as an indicator for the user 105. For example, a credit score, a periodic bank balance, a periodic expense, and the like, can be monitored to generate notifications if any of the monitored values are above (or below) corresponding configurable threshold values.

It is understood that although the examples described herein use '$' as the currency, the technical solutions described herein are effective for any currency type. In one or more embodiments of the present invention, the user 105 can choose a currency type that s/he desires to be used by the system 100. In one or more embodiments of the present invention, a combination of currencies can also be used.

Figure 8:
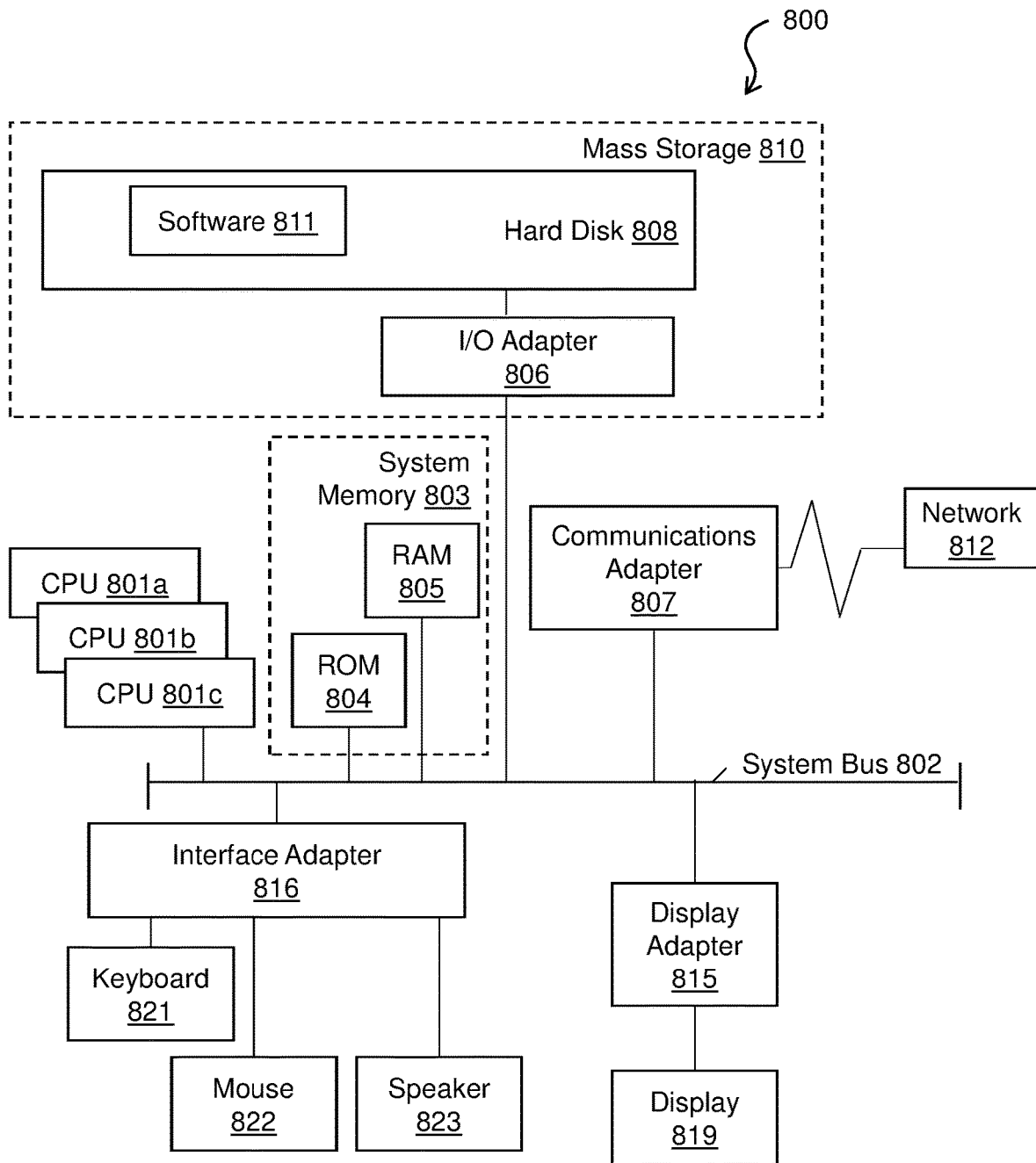
FIG. 8 depicts a computer system that can implement one or more embodiments of the present invention.

Turning now to FIG. 8, a computer system 800 is generally shown in accordance with an embodiment. The computer system 800 can be an electronic, computer framework comprising and/or employing any number and combination of computing devices and networks utilizing various communication technologies, as described herein. For example, the computer system 800 can include one or more processing units such as arithmetic logic unit, processors, and the like for performing one or more mathematical operations used by the technical solutions described herein. For example, the processing units can be 32-bit, 64-bit, 16-bit, and the like. The computer system 800 can implement any of the components described in FIG. 1.

The computer system 800 can be easily scalable, extensible, and modular, with the ability to change to different services or reconfigure some features independently of others. The computer system 800 may be, for example, a server, desktop computer, laptop computer, tablet computer, or smartphone. In some examples, computer system 800 may be a cloud computing node. Computer system 800 may be described in the general context of computer system executable instructions, such as program modules, being executed by a computer system. Generally, program modules may include routines, programs, objects, components, logic, data structures, and so on that perform particular tasks or implement particular abstract data types. Computer system 800 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system 800 has one or more central processing units (CPU(s)) 801a, 801b, 801c, etc. (collectively or generically referred to as processor(s) 801). The processors 801 can be a single-core processor, multi-core processor, computing cluster, or any number of other configurations. The processors 801, also referred to as processing circuits, are coupled via a system bus 802 to a system memory 803 and various other components. The system memory 803 can include a read only memory (ROM) 804 and a random access memory (RAM) 805. The ROM 804 is coupled to the system bus 802 and may include a basic input/output system (BIOS), which controls certain basic functions of the computer system 800. The RAM is read-write memory coupled to the system bus 802 for use by the processors 801. The system memory 803 provides temporary memory space for operations of said instructions during operation. The system memory 803 can include random access memory (RAM), read only memory, flash memory, or any other suitable memory systems.

The computer system 800 comprises an input/output (I/O) adapter 806 and a communications adapter 807 coupled to the system bus 802. The I/O adapter 806 may be a small computer system interface (SCSI) adapter that communicates with a hard disk 808 and/or any other similar component. The I/O adapter 806 and the hard disk 808 are collectively referred to herein as a mass storage 810.

Software 811 for execution on the computer system 800 may be stored in the mass storage 810. The mass storage 810 is an example of a tangible storage medium readable by the processors 801, where the software 811 is stored as instructions for execution by the processors 801 to cause the computer system 800 to operate, such as is described herein below with respect to the various Figures. Examples of computer program product and the execution of such instruction is discussed herein in more detail. The communications adapter 807 interconnects the system bus 802 with a network 812, which may be an outside network, enabling the computer system 800 to communicate with other such systems. In one embodiment, a portion of the system memory 803 and the mass storage 810 collectively store an operating system, which may be any appropriate operating system, such as the z/OS or AIX operating system from IBM Corporation, to coordinate the functions of the various components shown in FIG. 8.

Additional input/output devices are shown as connected to the system bus 802 via a display adapter 815 and an interface adapter 816 and. In one embodiment, the adapters 806, 807, 815, and 816 may be connected to one or more I/O buses that are connected to the system bus 802 via an intermediate bus bridge (not shown). A display 819 (e.g., a screen or a display monitor) is connected to the system bus 802 by a display adapter 815, which may include a graphics controller to improve the performance of graphics intensive applications and a video controller. A keyboard 821, a mouse 822, a speaker 823, etc. can be interconnected to the system bus 802 via the interface adapter 816, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 8, the computer system 800 includes processing capability in the form of the processors 801, and, storage capability including the system memory 803 and the mass storage 810, input means such as the keyboard 821 and the mouse 822, and output capability including the speaker 823 and the display 819.

In some embodiments, the communications adapter 807 can transmit data using any suitable interface or protocol, such as the internet small computer system interface, among others. The network 812 may be a cellular network, a radio network, a wide area network (WAN), a local area network (LAN), or the Internet, among others. An external computing device may connect to the computer system 800 through the network 812. In some examples, an external computing device may be an external webserver or a cloud computing node.

It is to be understood that the block diagram of FIG. 8 is not intended to indicate that the computer system 800 is to include all of the components shown in FIG. 8. Rather, the computer system 800 can include any appropriate fewer or additional components not illustrated in FIG. 8 (e.g., additional memory components, embedded controllers, modules, additional network interfaces, etc.). Further, the embodiments described herein with respect to computer system 800 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Although specific embodiments of the invention have been described, one of ordinary skill in the art will recognize that numerous other modifications and alternative embodiments are within the scope of the invention. For example, any of the functionality and/or processing capabilities described with respect to a particular system, system component, device, or device component may be performed by any other system, device, or component. Further, while various illustrative implementations and architectures have been described in accordance with embodiments of the invention, one of ordinary skill in the art will appreciate that numerous other modifications to the illustrative implementations and architectures described herein are also within the scope of this invention. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for financial liability payment calculation, the method comprising:
   receiving, by a processor, a source code for calculating a repayment schedule for a set of financial liabilities of a user;
   revising, by the processor, a value assigned to a threshold duration in the source code, the threshold duration is for negative amortization calculation, wherein revising the value comprises:
      determining a type of the processor used to execute the source code, wherein the type of the processor indicates a data width that the processor uses; and
      selecting the value of the threshold duration based on the type of the processor to prevent the negative amortization calculation from entering an unending loop;
   detecting, by the processor, that a first financial liability is in negative amortization using the threshold duration that is based on the type of the processor;
   computing, by the processor, using the source code, the repayment schedule for the set of financial liabilities using the threshold duration that is based on the type of the processor, wherein computing the repayment schedule comprises:
      computing priorities for each of the financial liabilities;
      reordering the financial liabilities according to the priorities;
      determining suggested payments for each of the financial liabilities using the threshold duration that is based on the type of the processor; and
      determining a repayment timeline for the set of financial liabilities using the suggested payments; and
   displaying, by the processor, the repayment schedule via a user interface.

2. The computer-implemented method of claim 1, wherein the threshold duration is configurable.

3. The computer-implemented method of claim 1, wherein a priority for a financial liability is computed based on a minimum payment and a current balance of said financial liability.

4. The computer-implemented method of claim 3, wherein the priority is computed as a ratio of the minimum payment to the current balance.

5. The computer-implemented method of claim 1, wherein computing the repayment schedule further comprises:
   determining a margin amount; and
   computing a suggested payment for the financial liability with the highest priority from the set of financial liabilities by adding the margin amount to a minimum payment amount of said financial liability.

6. The computer-implemented method of claim 1 further comprising, computing a repayment schedule for a future financial liability that starts at a future time-point.

7. A system comprising:
   a memory device; and
   a processor coupled with the memory device, the processor configured to perform a method for financial liability payment calculation, the method comprising:
      receiving a source code for calculating a repayment schedule for a set of financial liabilities of a user;
      revising a value assigned to a threshold duration in the source code, the threshold duration is for negative amortization calculation, wherein revising the value comprises:
         determining a type of the processor used to execute the source code, wherein the type of the processor indicates a data width that the processor uses; and
         selecting the value of the threshold duration based on the type of the processor to prevent the negative amortization calculation from entering an unending loop;
      detecting that a first financial liability is in negative amortization using the threshold duration that is based on the type of the processor;
      computing using the source code, the repayment schedule for the set of financial liabilities using the threshold duration that is based on the type of the processor, wherein computing the repayment schedule comprises:
         computing priorities for each of the financial liabilities;
         reordering the financial liabilities according to the priorities;
         determining suggested payments for each of the financial liabilities using the threshold duration that is based on the type of the processor; and
         determining a repayment timeline for the set of financial liabilities using the suggested payments; and
      displaying the repayment schedule via a user interface.

8. The system of claim 7, wherein the threshold duration is configurable.

9. The system of claim 7, wherein a priority for a financial liability is computed based on a minimum payment and a current balance of said financial liability.

10. The system of claim 9, wherein the priority is computed as a ratio of the minimum payment to the current balance.

11. The system of claim 7, wherein computing the repayment schedule further comprises:
   determining a margin amount; and
   computing a suggested payment for the financial liability with the highest priority from the set of financial liabilities by adding the margin amount to a minimum payment amount of said financial liability.

12. The system of claim 7 further comprising, computing a repayment schedule for a future financial liability that starts at a future time-point.

13. A computer program product comprising one or more memory devices with computer executable instructions stored thereon, the computer executable instructions when executed by a computer causes the computer to execute a method comprising:
- receiving a source code for calculating a repayment schedule for a set of financial liabilities of a user;
- revising a value assigned to a threshold duration in the source code, the threshold duration is for negative amortization calculation, wherein revising the value comprises:
  - determining one or more attributes of hardware components of the computer, the one or more attributes indicate a numerical limit of the computer; and
  - selecting the value of the threshold duration based on the one or more attributes to prevent the negative amortization calculation from entering an unending loop;
- detecting that a first financial liability is in negative amortization using the threshold duration that is based on the one or more attributes;
- computing using the source code, the repayment schedule for the set of financial liabilities using the threshold duration that is based on the one or more attributes, wherein computing the repayment schedule comprises:
  - computing priorities for each of the financial liabilities;
  - reordering the financial liabilities according to the priorities;
  - determining suggested payments for each of the financial liabilities using the threshold duration; and
  - determining a repayment timeline for the set of financial liabilities using the suggested payments; and
- displaying the repayment schedule via a user interface.

14. The computer program product of claim 13, wherein a priority for a financial liability is computed based on a minimum payment and a current balance of said financial liability.

15. The computer program product of claim 14, wherein the priority is computed as a ratio of the minimum payment to the current balance.

16. The computer program product of claim 13, wherein computing the repayment schedule further comprises:
- determining a margin amount; and
- computing a suggested payment for the financial liability with the highest priority from the set of financial liabilities by adding the margin amount to a minimum payment amount of said financial liability.

17. The computer program product of claim 13 further comprising, computing a repayment schedule for a future financial liability that starts at a future time-point.

18. The computer program product of claim 13, wherein, the one or more attributes comprise a type of a processor used to execute the source code, wherein the type of the processor indicates a data width that the computer uses.

\* \* \* \* \*